United States Patent
Toda et al.

(10) Patent No.: US 7,301,293 B2
(45) Date of Patent: Nov. 27, 2007

(54) ELECTRIC MOTOR CAR CONTROL APPARATUS

(75) Inventors: Shinichi Toda, Fuchu (JP); Yukitaka Monden, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/429,076

(22) Filed: May 8, 2006

(65) Prior Publication Data

US 2006/0290318 A1 Dec. 28, 2006

(30) Foreign Application Priority Data

May 9, 2005 (JP) .............................. 2005-136670

(51) Int. Cl.
  *H02P 5/00* (2006.01)
  *H02P 5/46* (2006.01)
  *H02P 7/08* (2006.01)
(52) U.S. Cl. ..................................................... 318/66
(58) Field of Classification Search ................... None
  See application file for complete search history.

(56) References Cited

U.S. PATENT DOCUMENTS 5,521,788 A * 5/1996 Miyazaki ..................... 361/42

FOREIGN PATENT DOCUMENTS

JP 2003-18702 1/2003

OTHER PUBLICATIONS

Doki et al., "A Study for Electric Double Layer Capacitor Series Connection for Railway Traction", JIASC Conference 3-32, pp. III-179-III-182, (2003).

* cited by examiner

*Primary Examiner*—Lincoln Donovan
*Assistant Examiner*—Erick Glass
(74) *Attorney, Agent, or Firm*—Finnegan, Henderson, Farabow, Garrett & Dunner, L.L.P.

(57) ABSTRACT

An electric motor control apparatus including an inverter which drives a motor of an electric motor car, storage unit for storing energy for the motor, and a converter which is connected to the storage unit, the inverter comprising detection unit for detecting a power value of the motor, and transmission unit for transmitting the power value detected by the detection unit to the converter, and the converter comprising calculation unit for receiving the power value transmitted by the transmission unit, and calculating an absorption current on the basis of the received power value, and control unit for controlling the storage unit on the basis of the absorption current calculated by the calculation unit.

3 Claims, 8 Drawing Sheets

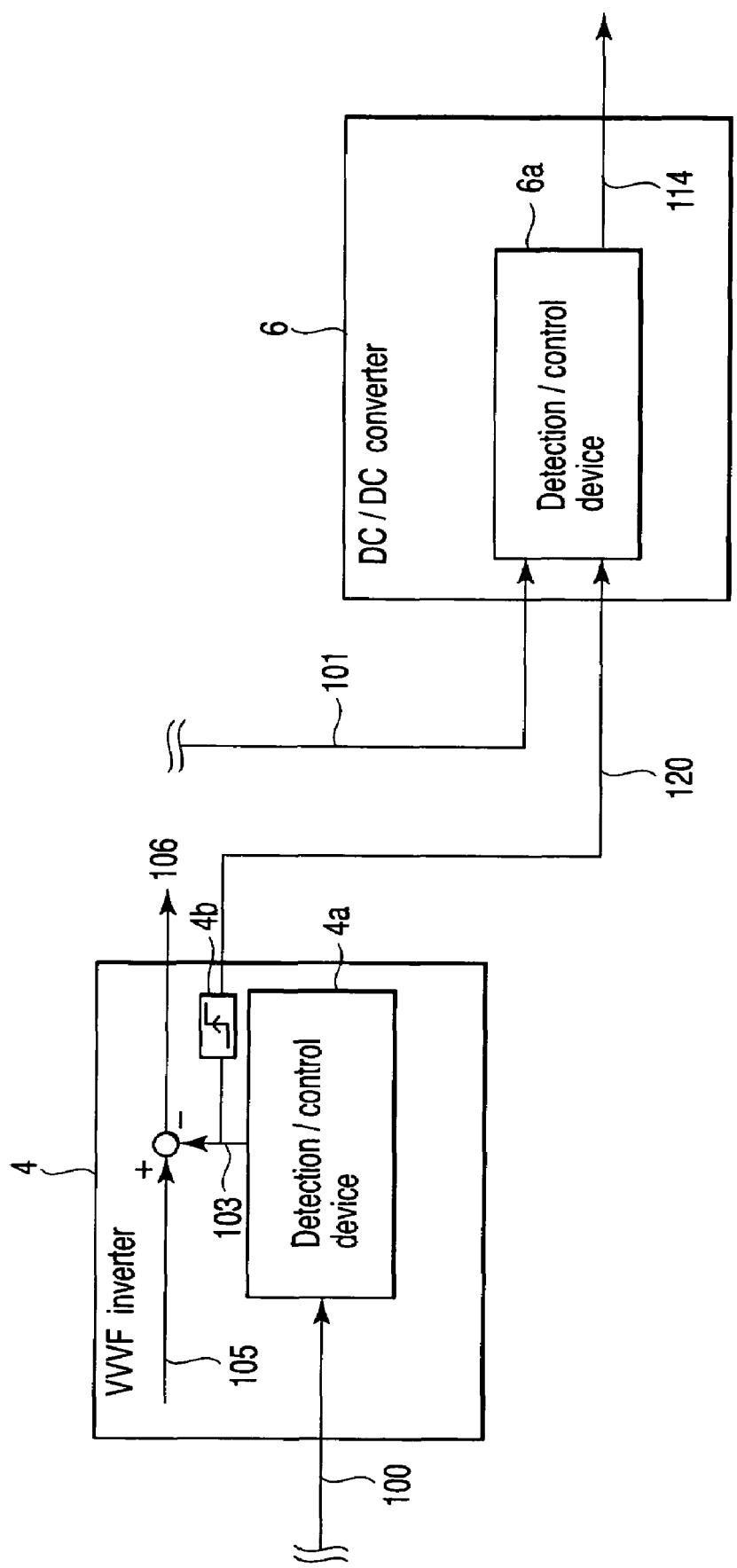
F I G. 11

ELECTRIC MOTOR CAR CONTROL APPARATUS

CROSS-REFERENCE TO RELATED APPLICATIONS

This application is based upon and claims the benefit of priority from prior Japanese Patent Application No. 2005-136670, filed May 9, 2005, the entire contents of which are incorporated herein by reference.

BACKGROUND OF THE INVENTION

1. Field of the Invention

The present invention relates to an electric motor car control apparatus.

2. Description of the Related Art

According to general techniques of electric double layer capacitor series connection in railway vehicles, as disclosed in, for example, Jpn. Pat. Appln. KOKAI Publication No. 2003-18702 and "A Study for Electric Double Layer Capacitor Series Connection for Railway Contraction", 2003 JIASC Conference 3-32, so-called regeneration limiter control is performed in a technique using a VVVF inverter. Regeneration limiter control is performed as follows. When a VVVF inverter is set, during regeneration braking, in a light-load regeneration state in which a load which absorbs regeneration energy on the overhead wire side becomes insufficient, a rise in overhead wire voltage due to a rise in the capacitor voltage of the VVVF inverter is detected, and the rise in overhead wire voltage is suppressed by reducing the regeneration braking force in accordance with the capacitor voltage. In this case, when the regeneration braking force is reduced, the reduced braking force is compensated for by the force generated by a mechanical brake. A DC/DC converter which performs charging control on a power storage device detects a light-load regeneration state upon a rise in the capacitor voltage of the DC/DC converter during braking, and controls a charging current to the power storage device so as to suppress a rise in capacitor voltage. The amount of power absorbed in the power storage device by the DC/DC converter and the regeneration braking force reduction control amount by VVVF regeneration limiter control are based on the respective filter capacitor voltages. In addition, control is performed to make an input current to the VVVF invert equal to an input current to the DC/DC converter. Alternatively, control is performed to make an input current to the overhead wire zero.

According to the above technique, the DC/DC converter detects a light-load regeneration state upon a rise in the capacitor voltage of the DC/DC converter during braking, and controls a charging current to the power storage device so as to suppress a rise in capacitor voltage. At this time, the amount of power absorbed in the power storage device by the DC/DC converter and the regeneration braking force reduction control amount by VVVF regeneration limiter control are determined by the respective filter capacitor voltages without direct control of them. For this reason, absorbed energy becomes insufficient or excessive with respect to energy corresponding to a regeneration load shortage due to capacitor voltage detection errors and voltage differences, resulting in failure to effectively absorb energy.

Although control is performed to make an input current with a VVVF equal to an input current to the DC/DC converter or control is performed to make an input current to the overhead wire zero, it is difficult in this method to discriminate a load state on the overhead wire side, and regeneration energy which can be returned to the overhead wire side may be absorbed by the power storage device through the DC/DC converter.

If absorbed energy is insufficient relative to energy corresponding to a regeneration load shortage, the overhead wire voltage rises, and VVVF regeneration limiter control operates to reduce the regeneration braking force. As a result, compensation by the mechanical brake is executed. In contrast to this, when absorbed energy becomes excessive, energy that can be returned to the overhead wire side is absorbed by the power storage device. Since the absorption capacity of the power storage device is limited, absorption cannot be continued.

In either of the above cases, the capacity of the VVVF power storage device cannot be used fully. That is, absorption cannot be effectively performed.

BRIEF SUMMARY OF THE INVENTION

In consideration of the above point, it is an object of the present invention to provide an electric motor car control apparatus which can effectively absorb power in a power storage device while keeping a balance between energy corresponding to a regeneration load shortage and absorbed energy.

In order to achieve the above object, according to an aspect of the present invention, there is provided an electric motor control apparatus comprising an inverter which drives a motor of an electric motor car, storage means for storing energy for the motor, and a converter which is connected to the storage means, the inverter comprising detection means for detecting a power value of the motor, and transmission means for transmitting the power value detected by the detection means to the converter, and the converter comprising calculation means for receiving the power value transmitted by the transmission means, and calculating an absorption current on the basis of the received power value, and control means for controlling the storage means on the basis of the absorption current calculated by the calculation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a block diagram showing the arrangements of the VVVF inverter and DC/DC converter of an electric motor car control apparatus according to a fourth embodiment of the present invention;

DETAILED DESCRIPTION OF THE INVENTION

An embodiment of the present invention will be described below with reference to the views of the accompanying drawing.

First Embodiment

Figure 1:
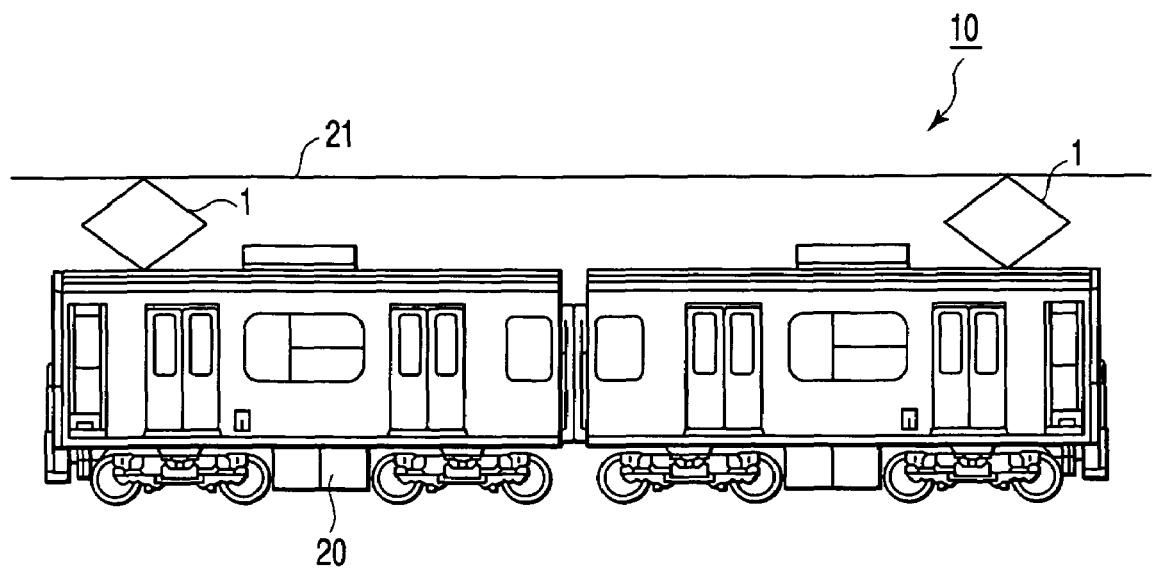
FIG. 1 is an external view showing an electric motor car comprising an electric motor car control apparatus according to a first embodiment of the present invention.

FIG. 1 is an external view showing an electric motor car comprising an electric motor car control apparatus according to a first embodiment of the present invention.

As shown in FIG. 1, an electric motor car 10 receives electricity from an overhead wire 21 through a pantograph 1. The received electricity is input to an electric motor car control apparatus 20.

Figure 2:
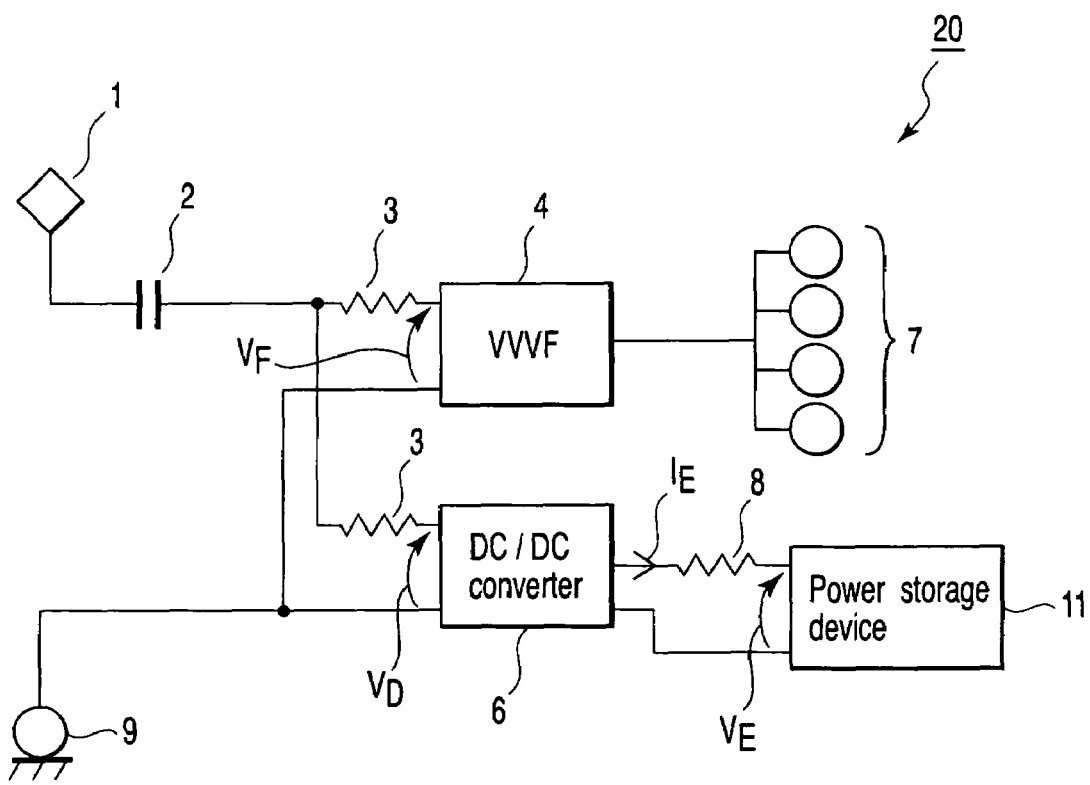
FIG. 2 is a block diagram showing the arrangement of the electric motor car control apparatus.

FIG. 2 is a block diagram showing the arrangement of the electric motor car control apparatus 20.

The electric motor car control apparatus 20 comprises the pantograph 1, a contactor 2, a filter reactor 3, a VVVF inverter 4, a DC/DC converter 6, a motor 7, a reactor 8, a wheel 9, and a power storage device 11. Let $V_F$, $V_D$, and $V_E$ be the voltages to be respectively applied to the VVVF inverter 4, DC/DC converter 6, and power storage device 11, and $I_E$ be the current flowing from the DC/DC converter 6 to the power storage device 11.

The operation of the electric motor car control apparatus 20 having the above arrangement will be described below.

Figure 3:
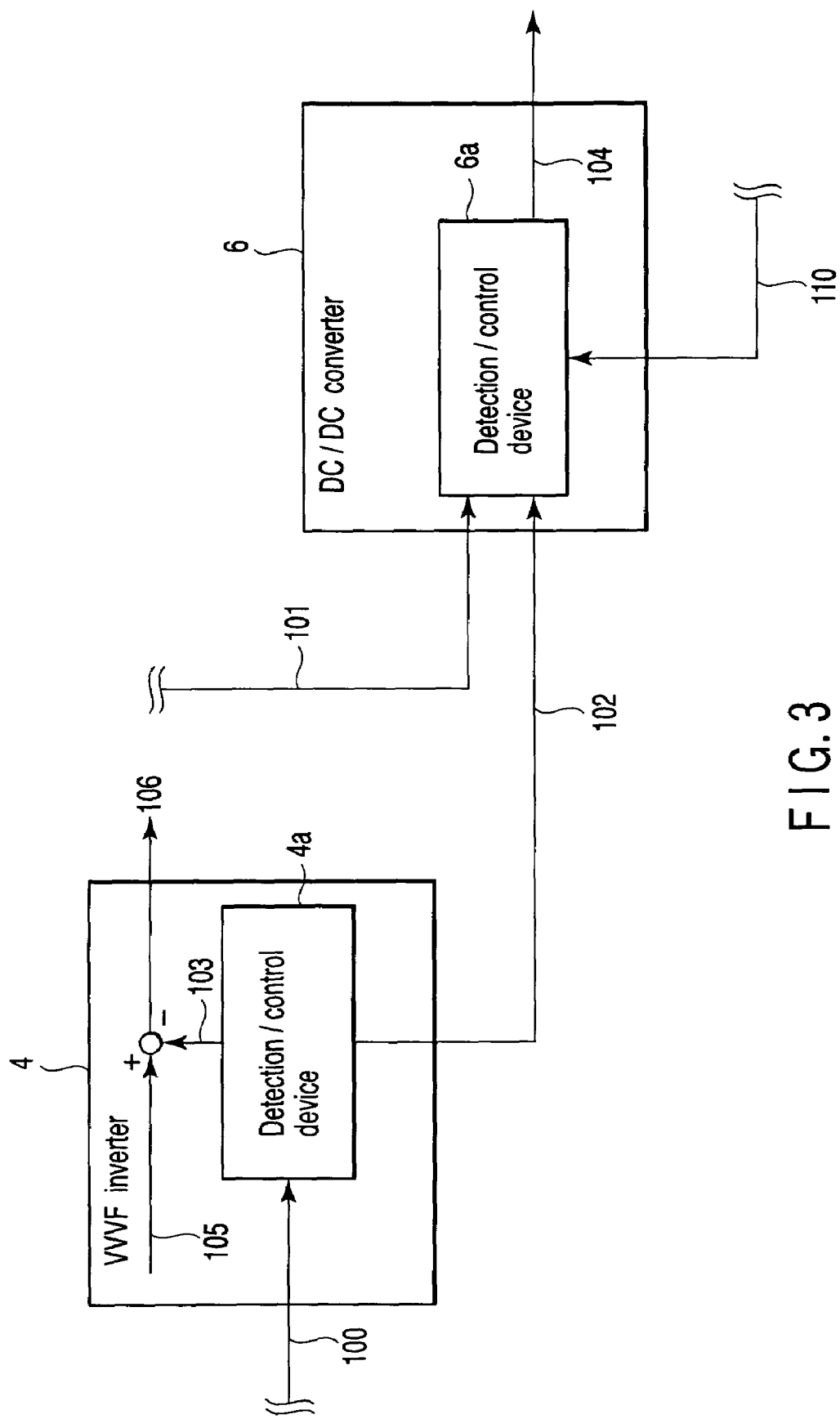
FIG. 3 is a block diagram showing the arrangements of a VVVF inverter and a DC/DC converter and signal processing.

FIG. 3 is a block diagram showing the arrangements of the VVVF inverter 4 and DC/DC converter 6 and signal processing.

The VVVF inverter 4 comprises a detection/control device 4a. The detection/control device 4a receives a VVVF inverter filter capacitor voltage value 100, the velocity information of the electric motor car, the torque information of the motor, a regeneration brake command 105, and the like. The detection/control device 4a calculates regeneration brake choke amount information 103 from the input information, and outputs, to the motor 7, a value obtained by subtracting the regeneration brake choke amount information 103 from the regeneration brake command 105 as a motor torque command, thereby controlling the motor 7.

Figure 4:
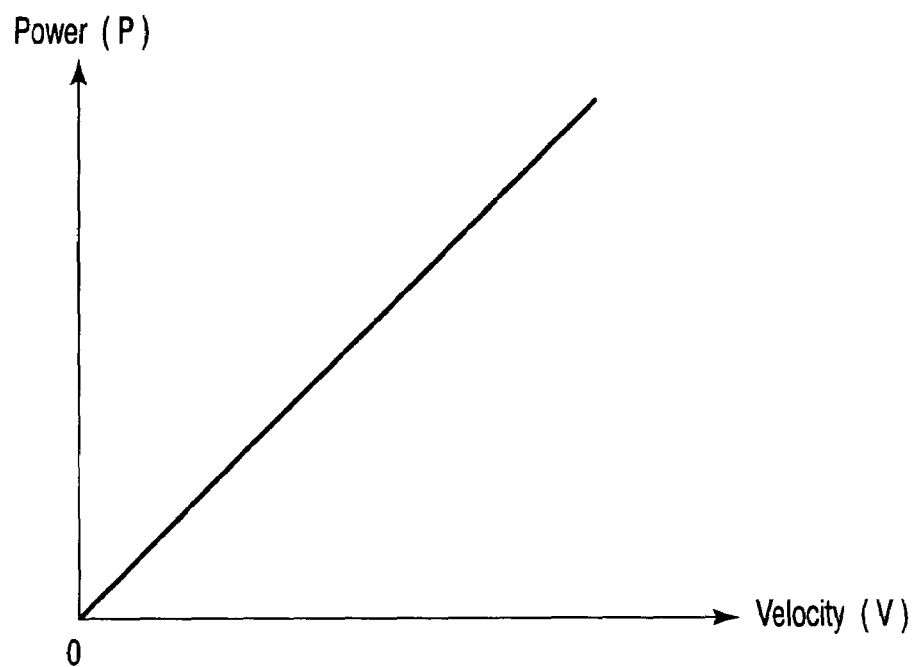
FIG. 4 is a graph showing the relationship between the motor torque, velocity, and power of the electric motor car.

The detection/control device 4a also calculates a power P from the input information by using the following equation, as shown in FIG. 4.

(torque of motor)*(velocity of electric motor car)
    =power P

The detection/control device 4a outputs power P information 102 to a detection/control device 6a which the DC/DC converter 6 comprises. A DC/DC converter filter capacitor voltage value 101 is input to the detection/control device 6a. In addition, a charging voltage value 110 is input from the power storage device 11 to the detection/control device 6a.

Figure 5:
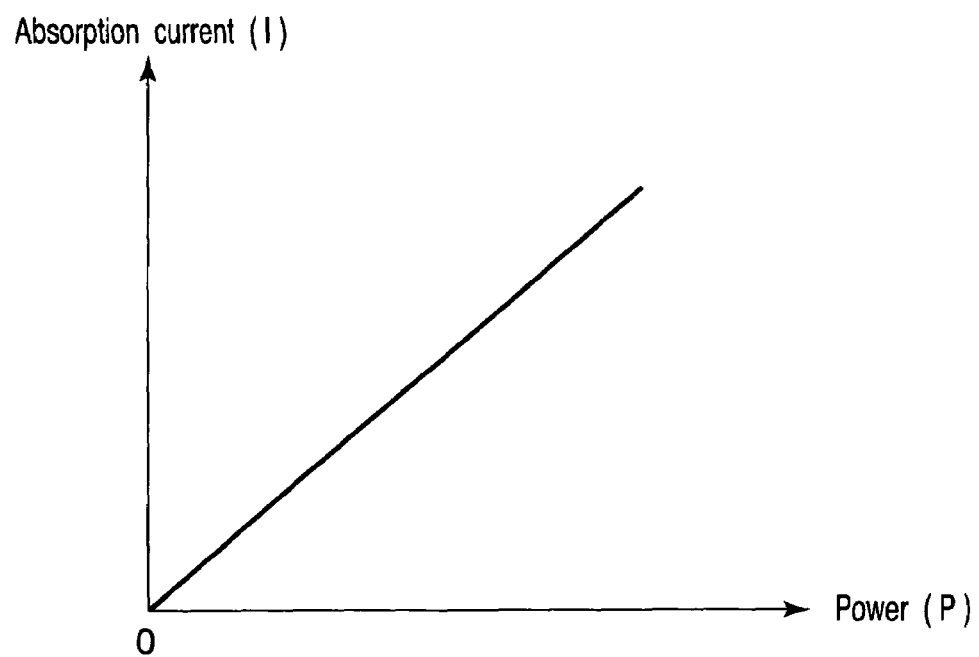
FIG. 5 is a graph showing the relationship between an absorption current and power.

The detection/control device 6a calculates an absorption current I from the input information by using the following equation, as shown in, for example, FIG. 5.

(power P)/(charging voltage from power storage
    device)=absorption current I

Upon calculating the absorption current I, the detection/control device 6a outputs the absorption current I as an absorption current command 104 to the power storage device 11 to control the power storage device 11.

With the above operation, the DC/DC converter is made to operate in accordance with various kinds of information detected by the VVVF inverter, thereby allowing the power storage device to effectively absorb power while keeping a balance between energy corresponding to a regeneration load shortage and absorbed energy.

Second Embodiment

Figure 6:
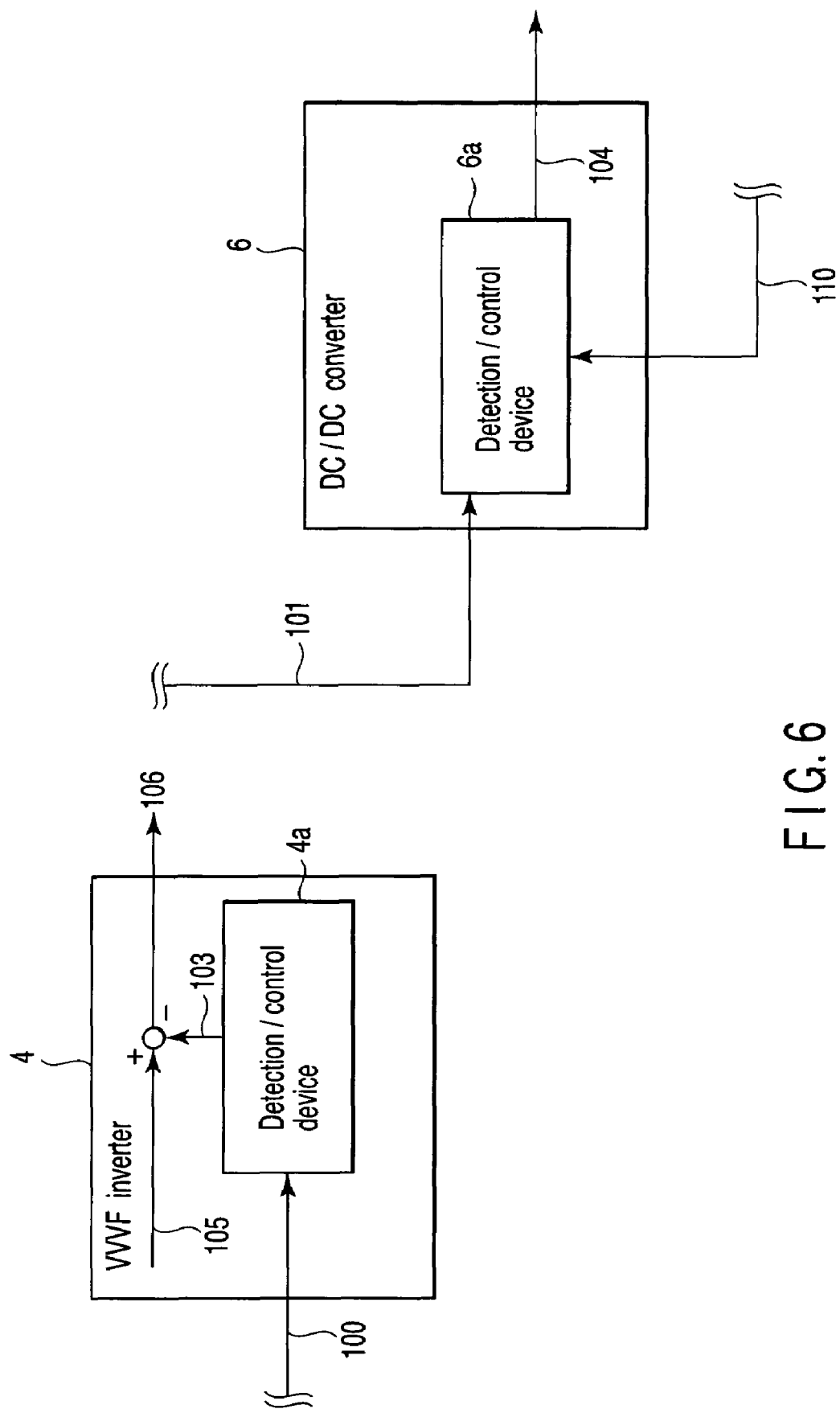
FIG. 6 is a block diagram showing the arrangements of the VVVF inverter and DC/DC converter of an electric motor car control apparatus according to a second embodiment of the present invention.

An electric motor car control apparatus according to a second embodiment of the present invention will be described next with reference to FIGS. 6 to 8. The same reference numbers as in the first embodiment denote the same parts in the second embodiment, and a detailed description thereof will be omitted.

The second embodiment differs from the first embodiment in that a detection/control device 4a of a VVVF inverter 4 outputs no information to a detection/control device 6a of a DC/DC converter 6, and an absorption start voltage value V3 of a DC/DC converter filter capacitor voltage value 101 with respect to a power storage device 11 is set in advance to be equal to an operation start voltage set value (regeneration limiter start voltage value) V1 of a filter capacitor voltage value 100.

Figure 7:
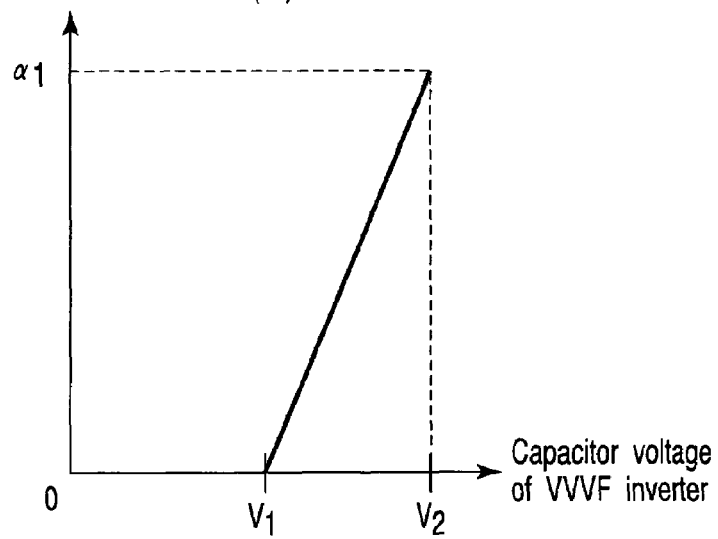
FIG. 7 is a graph showing the relationship between a regeneration brake choke amount α and an operation start voltage set value (regeneration limiter start voltage value) V1 of a filter capacitor voltage value.

FIG. 7 shows the relationship between a regeneration brake choke amount α and the operation start voltage set value (regeneration limiter start voltage value) V1 of the filter capacitor voltage value 100. As in the first embodiment, the DC/DC converter filter capacitor voltage value 101 is input to the detection/control device 6a.

Figure 8:
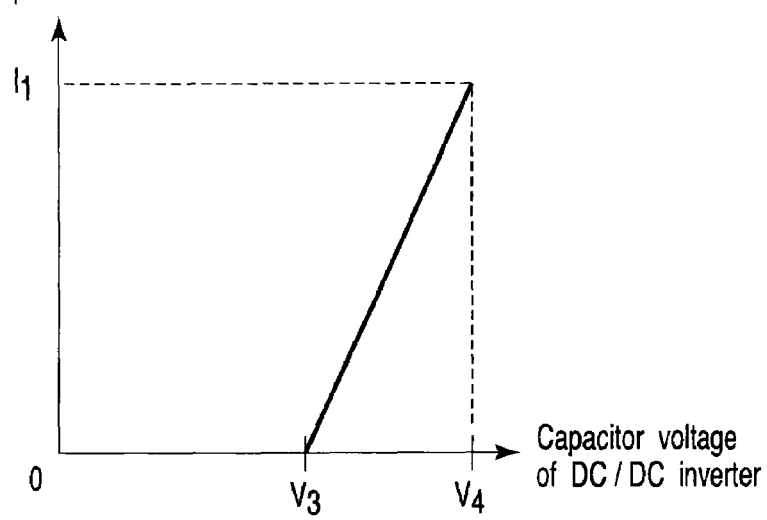
FIG. 8 is a graph showing the relationship between an absorption current and a VVVF inverter capacitor voltage.

As shown in FIG. 8, the detection/control device 6a of the DC/DC converter 6 sets the absorption start voltage value V3 of the DC/DC converter filter capacitor voltage value 101 with respect to the power storage device 11 to be equal to the value of V1. The detection/control device 6a then calculates an absorption current I on the basis of the DC/DC converter filter capacitor voltage value 101, and outputs it as the absorption current command 104 to the power storage device 11, thereby controlling the power storage device 11.

The above operation makes it possible to ensure proper balance and cooperation between regeneration energy from the VVVF inverter and absorbed power by the DC/DC converter, thereby solving problems in terms of shortage or excess of absorbed energy.

Third Embodiment

Figure 9:
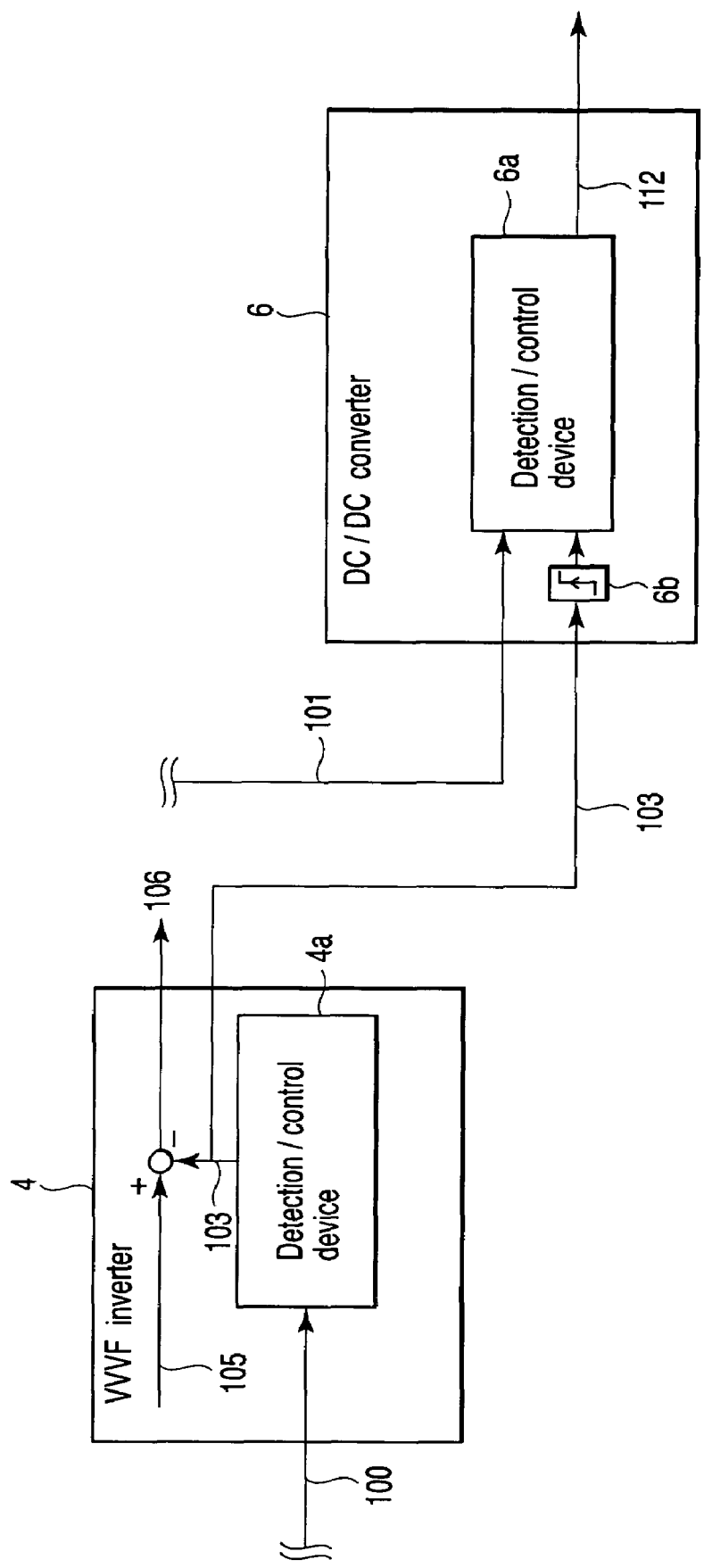
FIG. 9 is a block diagram showing the arrangements of the VVVF inverter and DC/DC converter of an electric motor car control apparatus according to a third embodiment of the present invention.

An electric motor control apparatus according to a third embodiment of the present invention will be described next with reference to FIGS. 9 and 10. The same reference numbers as in the first embodiment denote the same parts in the third embodiment, and a detailed description thereof will be omitted.

The third embodiment differs from the first embodiment in that information output from a detection/control device 4a of a VVVF inverter 4 to a detection/control device 6a of a DC/DC converter 6 is different from regeneration brake choke amount information 103.

The DC/DC converter 6 further comprises a predetermined value detection unit 6b. The predetermined value detection unit 6b outputs a correction command for correcting an absorption start voltage value V3 to a value V3' to the detection/control device 6a of the DC/DC converter 6 on the basis of the input regeneration brake choke amount information 103 (see FIG. 10). The predetermined value detection unit 6b is set to output a correction command to the detection/control device 6a of the DC/DC converter 6 if, for example, α>0 (regeneration brake choke amount α).

The detection/control device 4a of the VVVF inverter 4 outputs the regeneration brake choke amount α as the regeneration brake choke amount information 103 to the detection/control device 6a of the DC/DC converter 6. At the same time, an operation start voltage set value V1 is output to the detection/control device 6a of the DC/DC converter 6. As in the first embodiment, a DC/DC converter filter capacitor voltage value 101 is input to the detection/control device 6a.

Figure 10:
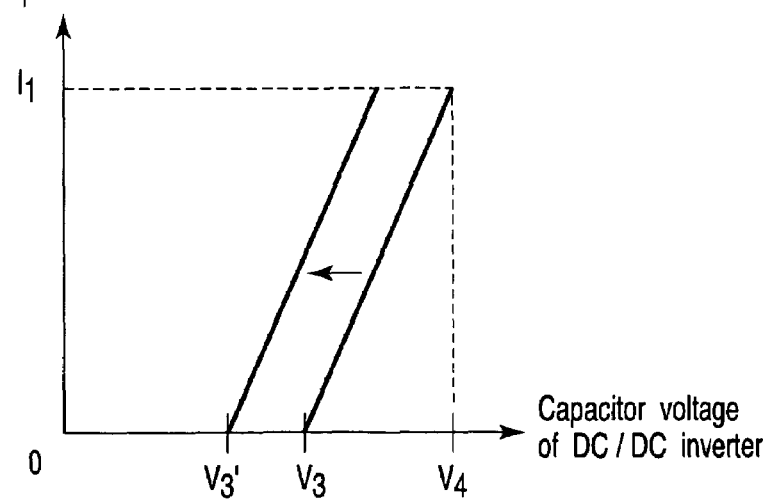
FIG. 10 is a graph showing the relationship between an absorption current and a DC/DC converter capacitor voltage.

As shown in FIG. 10, the detection/control device 6a of the DC/DC converter 6 sets and controls the absorption start voltage value V3 of the DC/DC converter filter capacitor voltage value 101 for the power storage device 11 to be equal to the value of V1 on the basis of the input regeneration brake choke amount information 103, operation start voltage set value V1, and DC/DC converter filter capacitor voltage value 101. The detection/control device 6a calculates an absorption current I on the basis of the DC/DC converter filter capacitor voltage value 101, and outputs it as an absorption current command 112 to a power storage device 11, thereby controlling the power storage device 11.

In the above state, if the predetermined value detection unit 6b discriminates, on the basis of the regeneration brake choke amount information 103 input to the predetermined value detection unit 6b, that, for example, α>0 (regeneration brake choke amount α), a correction command for correcting the absorption start voltage value V3 to the value V3' is output to the detection/control device 6a of the DC/DC converter 6. Upon receiving the correction command, the detection/control device 6a of the DC/DC converter 6 corrects the absorption start voltage value V3 to the value V3', as shown in FIG. 10.

That is, when regeneration limiter control is started upon a rise in the capacitor voltage of the VVVF inverter 4, the VVVF inverter 4 outputs the regeneration brake choke amount information 103 to the DC/DC converter 6. If the value of the regeneration brake choke amount exceeds a predetermined value, the DC/DC converter 6 corrects the absorption start voltage value V3 so as to decrease it to the value V3'. As a consequence, the capacitor voltage of the VVVF inverter becomes lower than the capacitor voltage of the DC/DC converter 6, and the operation of the DC/DC converter 6 is started to start absorption in the power storage device 11.

With the above operation, if the capacitor voltage of the VVVF inverter is higher than that of the DC/DC converter, power absorption by the DC/DC converter by only VVVF regeneration limiter control can be prevented, thereby eliminating the problem of insufficient power absorption by performing regeneration limiter control operation using the VVVF inverter in synchronism with power absorption control operation by the DC/DC converter.

Fourth Embodiment

Figure 12:
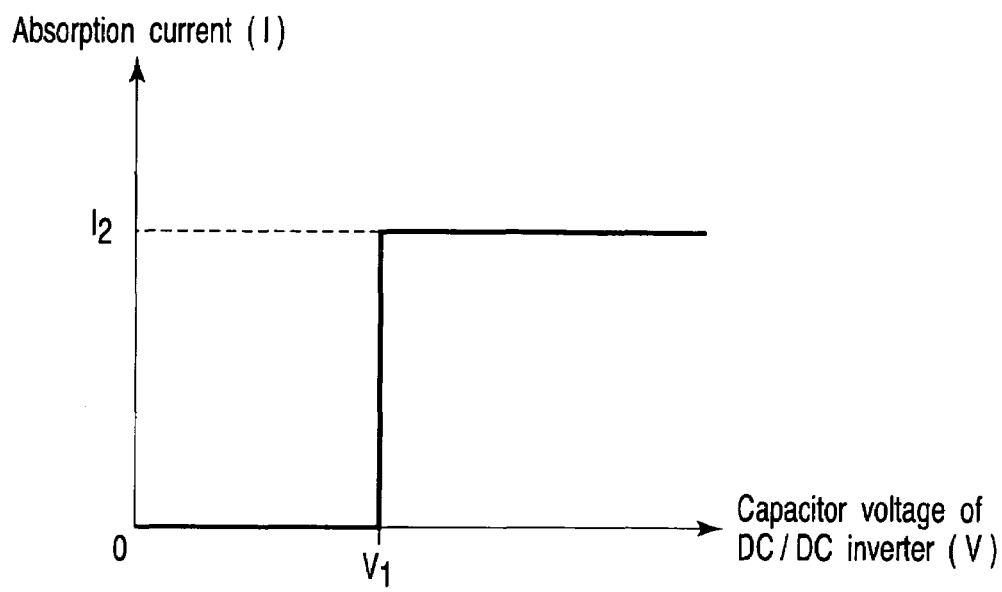
FIG. 12 is a graph showing the relationship between an absorption current and a DC/DC converter capacitor voltage.

An electric motor car control apparatus according to a fourth embodiment of the present invention will be described next with reference to FIGS. 11 and 12. The same reference numbers as in the third embodiment denote the same parts in the fourth embodiment, and a detailed description thereof will be omitted.

The fourth embodiment differs from the third embodiment in that regeneration brake choke amount information 103 output from a detection/control device 4a of a VVVF inverter 4 to a detection/control device 6a of a DC/DC converter 6 is a digital signal.

For this reason, the DC/DC converter 6 does not comprise a predetermined value detection unit 6b. In contrast, the VVVF inverter 4 comprises a predetermined value detection unit 4b.

With the above arrangement, an operation command 120 is transmitted as a digital signal from the VVVF inverter 4 to the DC/DC converter 6.

When regeneration limiter control is started upon a rise in the capacitor voltage of the VVVF inverter 4, the VVVF inverter 4 transmits the operation command 120 as a digital signal to the DC/DC converter 6 through the predetermined value detection unit 4b. As shown in FIG. 12, upon receiving the operation command 120, the DC/DC converter 6 calculates an absorption current I2, and outputs it as an absorption current command 114 to a power storage device 11, thereby controlling the power storage device 11.

With the above operation, the start of regeneration limiter control using the VVVF inverter 4 can be synchronized with the start of power absorption by the DC/DC converter 6, thereby preventing the occurrence of insufficient power absorption. In addition, using a digital signal as the operation command 120 makes it possible to simplify the arrangement of the DC/DC converter 6.

Fifth Embodiment

An electric motor control apparatus according to a fifth embodiment of the present invention will be described next with reference to FIG. 13.

Figure 13:
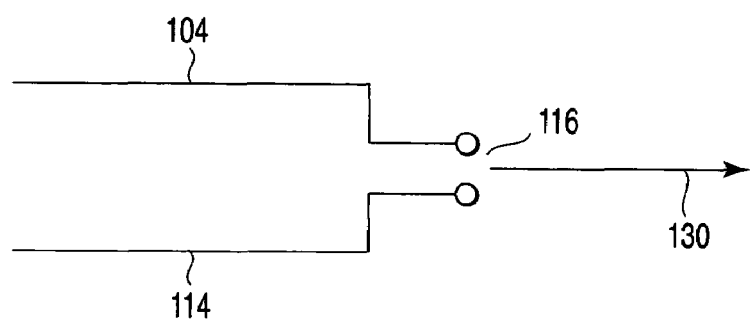
FIG. 13 is a schematic view showing the arrangement of an electric motor car control apparatus according to a fifth embodiment of the present invention.

In the fifth embodiment, as shown in FIG. 13, both the absorption current command 104 in the first embodiment and the absorption current command 114 in the fourth embodiment are used.

The absorption current command 104 and the absorption current command 114 can be switched by using a switch 116, and each command can be output as an output absorption current command 130. If, for example, the switch 116 switches the commands to output the absorption current command 104, the output absorption current command 130 becomes a power running command. If the switch 116 switches the commands to output the absorption current command 114, the output absorption current command 130 becomes a regeneration command. The output absorption current command 130 is then output to a power storage device 11 to control it.

With the above operation, in addition to the effects of the first and fifth embodiments, the power storage device can be controlled by switching the embodiments of power running and regeneration.

Sixth Embodiment

An electric motor control apparatus according to a sixth embodiment of the present invention will be described next with reference to FIG. 14.

Figure 14:
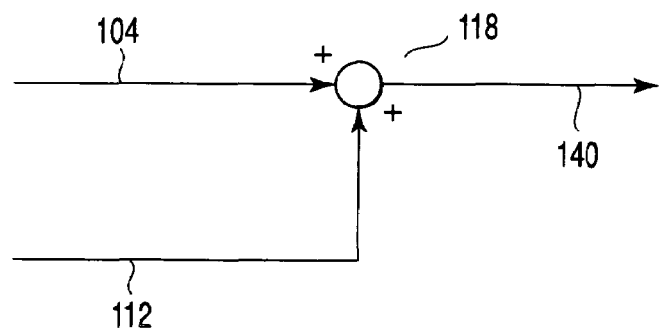
FIG. 14 is a schematic view showing the arrangement of an electric motor car control apparatus according to a sixth embodiment of the present invention.

In the sixth embodiment, as shown in FIG. 14, both the absorption current command 104 in the first embodiment and the absorption current command 112 in the second embodiment are used.

The absorption current command 104 and the absorption current command 112 are subjected to addition processing by using an adder 118, and the resultant information is output as an output absorption current command 140. The output absorption current command 140 is then output to a power storage device 11 to control the power storage device 11.

With the above operation, in addition to the effects of the first and second embodiments, the power storage device can be controlled on the basis of the absorption current commands in the first and second embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electric motor control apparatus comprising an inverter which drives a motor of an electric motor car, storage means for storing energy for the motor, and a converter which is connected to the storage means, the inverter comprising detection means for detecting a power value of the motor, and transmission means for transmitting the power value detected by the detection means to the converter, and the converter comprising calculation means for receiving the power value transmitted by the transmission means and calculating an absorption current on the basis of the received power value, and control means for controlling the storage means on the basis of the absorption current calculated by the calculation means, wherein the detection means detects the power value of the motor from velocity information of the electric motor car, motor torque information of the motor, and charging voltage of the storage means.

2. An electric motor car control apparatus comprising an inverter which drives a motor of an electric motor car, storage means for storing energy for the motor, and a converter which is connected to the storage means, wherein the converter makes an operation start voltage set value of a filter capacitor voltage upon regeneration limiter control by the inverter coinciding with an operation start voltage set value of a filter capacitor voltage of the converter;

the converter controls the storage means on the basis of a command from the inverter, the command being regeneration brake force choke amount information from the inverter; and the converter corrects an operation start voltage set value of the filter capacitor voltage on the basis of the regeneration brake force choke amount information.

3. An electric motor car control apparatus comprising an inverter which drives a motor of an electric motor car, storage means for storing energy for the motor, and a converter which is connected to the storage means, wherein the converter makes an operation start voltage set value of a filter capacitor voltage upon regeneration limiter control by the inverter coinciding with an operation start voltage set value of a filter capacitor voltage of the converter;

the converter controls the storage means on the basis of a command from the inverter, the command being an operation command from the inverter on the basis of regeneration brake force choke amount information; and the converter calculates an absorption current to be output, the storage means being controlled by the calculated absorption current.

* * * * *